Nov. 29, 1960  C. E. CLEETON  2,962,707
SIMULTANEOUS DISPLAY OF MULTI-CHANNEL SIGNALS
Filed July 8, 1952  7 Sheets-Sheet 1
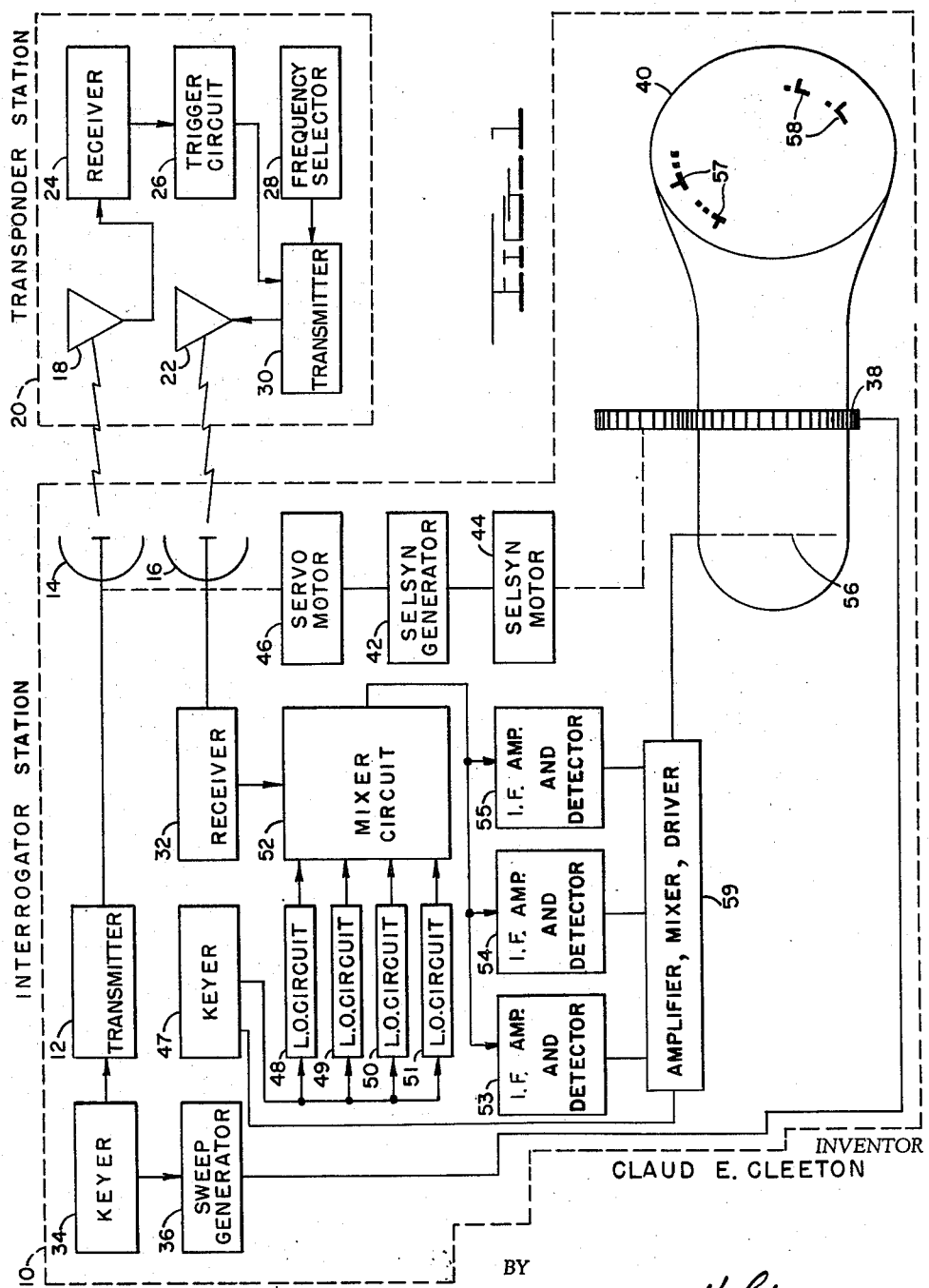
INVENTOR
CLAUD E. CLEETON
BY
ATTORNEY

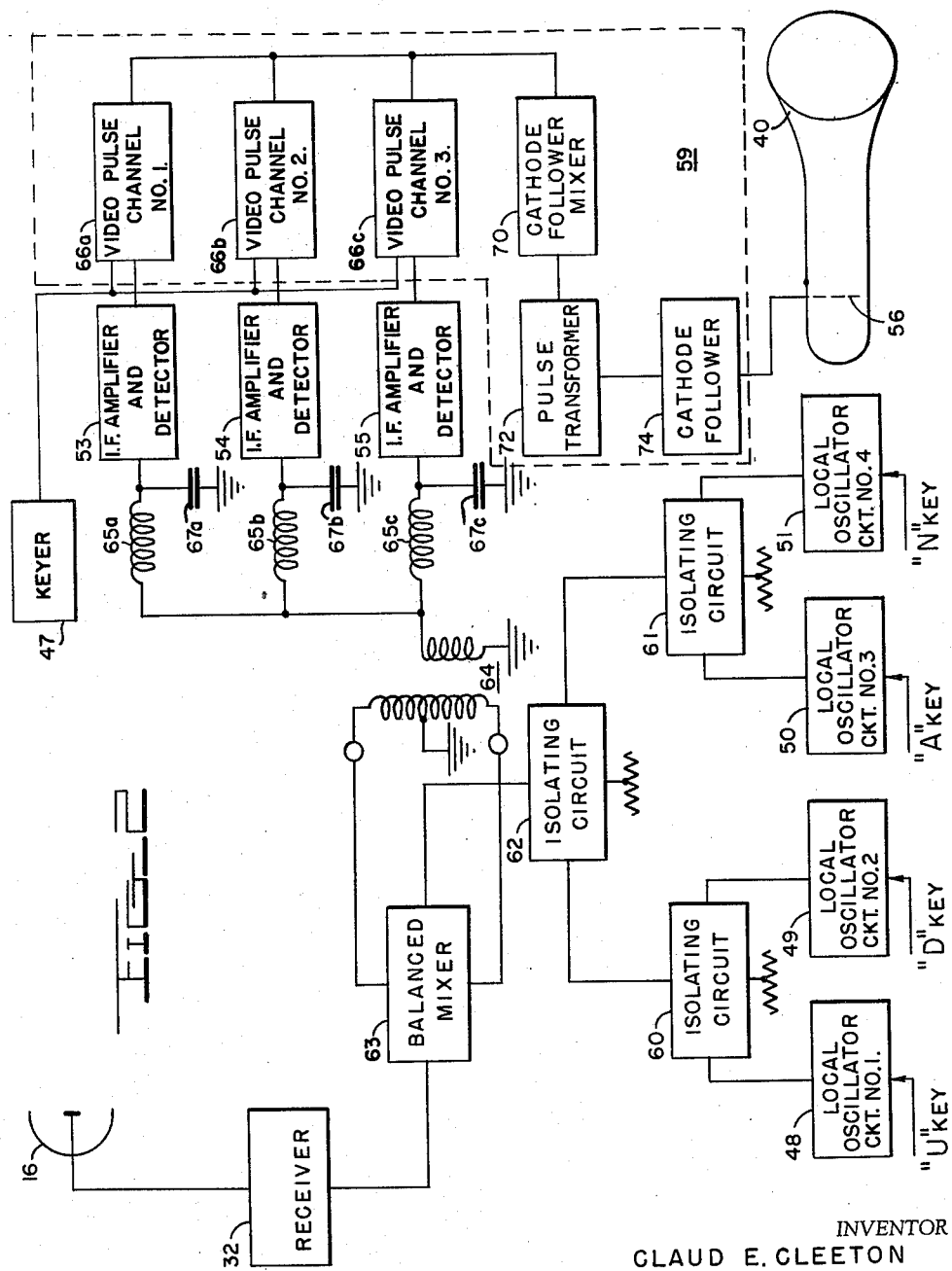

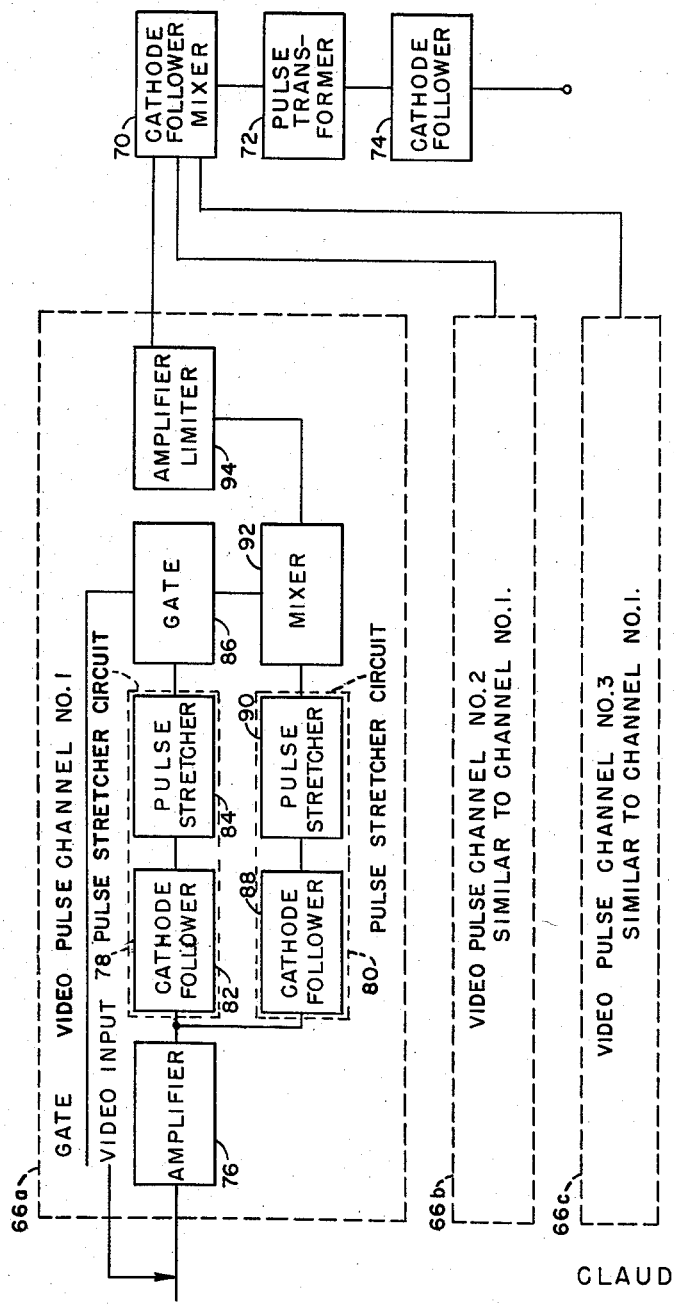

Nov. 29, 1960
C. E. CLEETON
2,962,707
SIMULTANEOUS DISPLAY OF MULTI-CHANNEL SIGNALS
Filed July 8, 1952
7 Sheets-Sheet 4
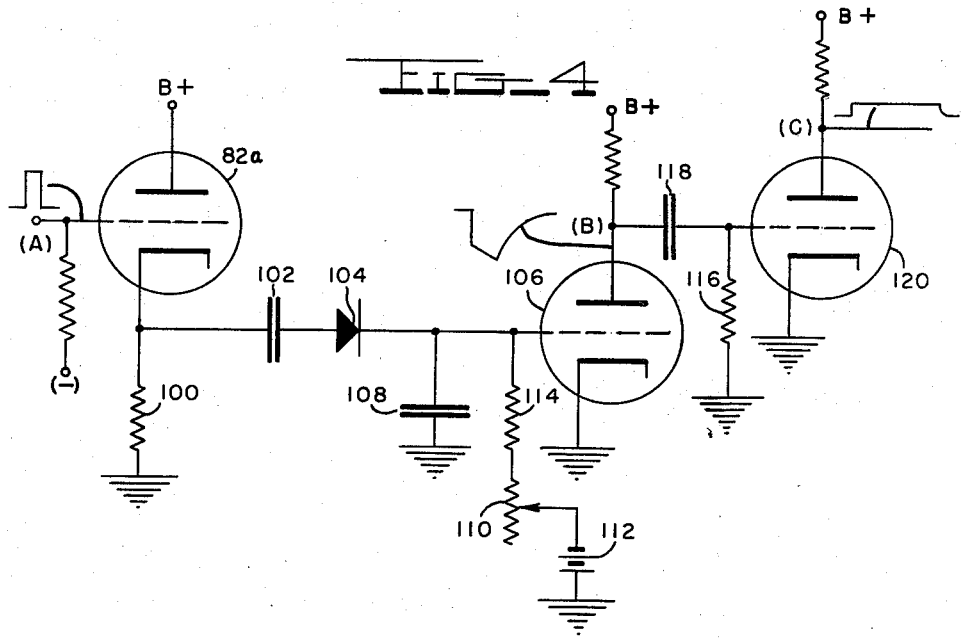
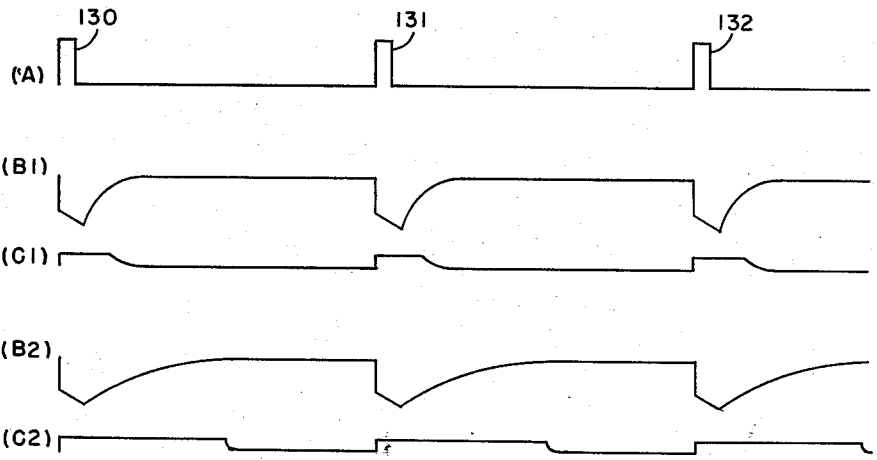
*INVENTOR*
CLAUD E. CLEETON
BY Howard White
ATTORNEY

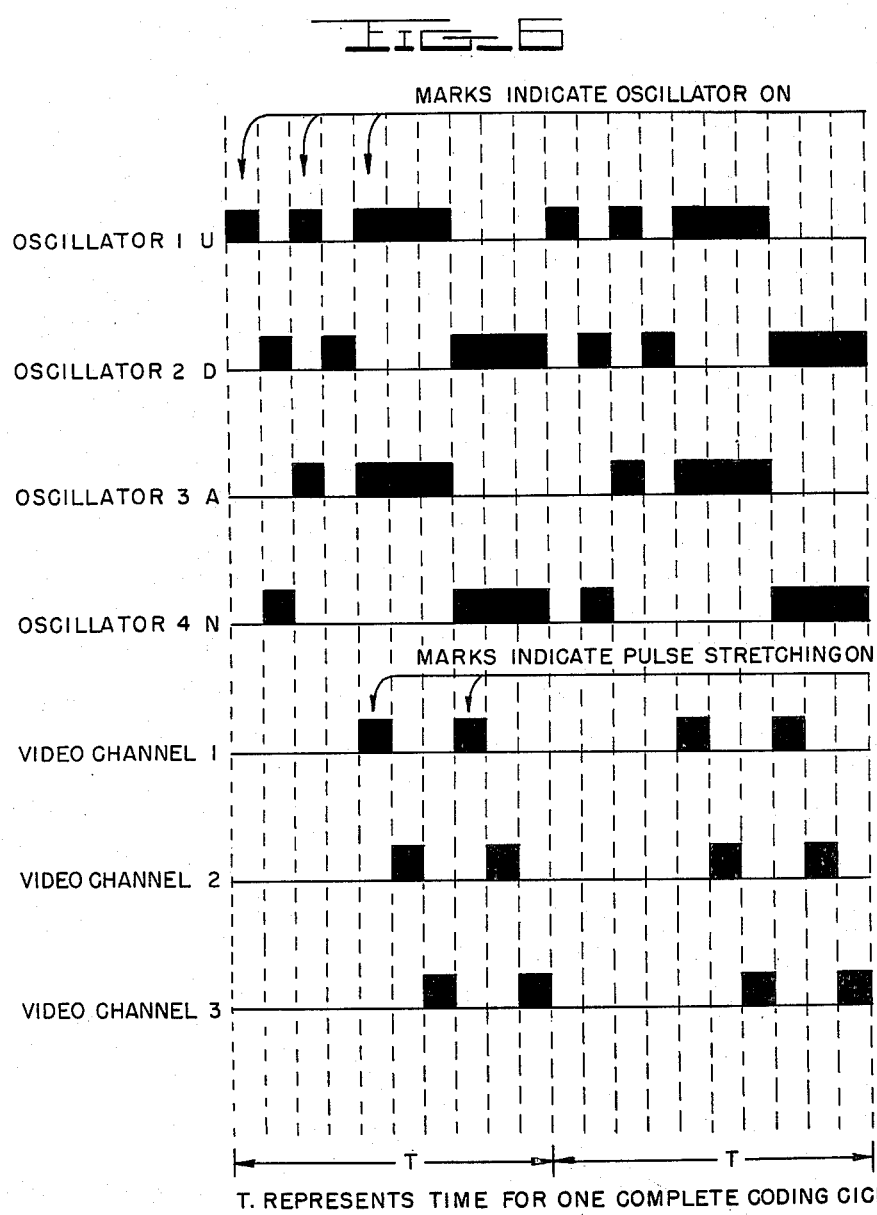

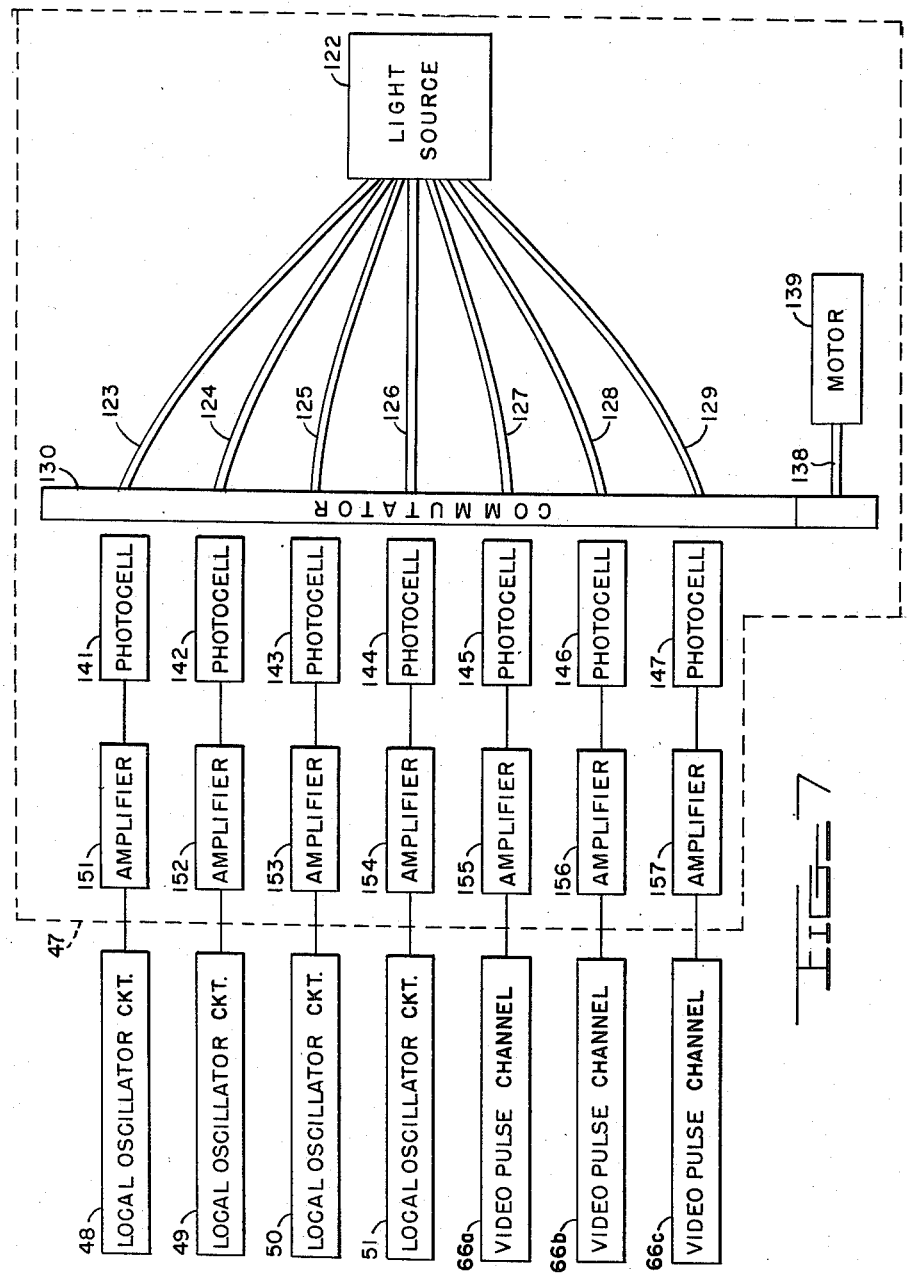

Nov. 29, 1960

C. E. CLEETON 2,962,707

SIMULTANEOUS DISPLAY OF MULTI-CHANNEL SIGNALS

Filed July 8, 1952

INVENTOR
CLAUD E. CLEETON

BY

ATTORNEY

United States Patent Office 2,962,707
Patented Nov. 29, 1960

2,962,707

SIMULTANEOUS DISPLAY OF MULTI-CHANNEL SIGNALS

Claud E. Cleeton, Washington, D.C.

Filed July 8, 1952, Ser. No. 297,795

16 Claims. (Cl. 343—6.5)

(Granted under Title 35, U.S. Code (1952), sec. 266)

This invention relates to radio beacon systems in general and in particular to a system for identifying and indicating the position of a multiplicity of radio beacon transmitters transmitting reply signals on different carrier frequencies in response to interrogation signals received from an interrogating transmitter.

Previously, the amount of data available from beacon systems has been limited to the location of various beacons in the range of the interrogator. By providing a plurality of receivers each tuned to a different frequency, it has become possible to indicate not only the relative locations of various beacons, but also the identity of each individual beacon in the system by assigning each beacon a unique transmission frequency matching that of one of the receivers in the system. However, such systems require a multiplicity of displays, one for each carrier frequency utilized by the various beacons.

An improvement over the aforementioned type of system is described in U.S. Patent No. 2,568,265 to Alverez. However, this patent shows a beacon system which requires a complex coder circuit at each beacon to enable each individual beacon to transmit itdentifying coded signals in response to pulse interrogations. In addition, the coded transponder signals transmitted produce presentations that are coded in range only, thereby limiting the number of different codes that may be simultaneously presented on a typical plan position indicator system.

It is, accordingly, an object of the present invention to provide a system capable of simultaneously displaying signals of various frequencies on a radar type presentation device and indicating the frequency of each signal displayed by modulating each individual frequency signal received with a characteristic code unique to each carrier frequency.

Another object of the present invention is to provide a receiver capable of simultaneously receiving signals of varying carrier frequencies and of displaying these signals in a novel and distinctive manner in association with a radar-type presentation.

It is another object to provide an improved identification system capable of being utilized as a beacon for traffic control at airports or seaports.

Another object of this invention is to provide an identification system wherein economy of parts is attained.

It is a further object of this invention to provide a beacon system wherein signals from a plurality of beacons, each transmitting on a different carrier frequency, are distinguished from each other by distinctive signal indications and are free from interference caused by other signals.

A still further object of this invention is to provide a simultaneous display system capable of being associated with a plan position indicator locater system wherein signals from various energy sources displayed in the system have their azimuth and range characteristics modulated in a manner dependent upon the carrier frequency of the signals transmitted by each source in the system.

Other objects and many of the attendant advantages of this invention will be readily appreciated as the same becomes better understood by reference to the following detailed description of a typical embodiment when considered in connection with the accompanying drawings wherein:

Figure 1 is a partial block and partial schematic diagram of a typical embodiment of the present invention, showing a typical interrogator station, a typical beacon including a transponder that is triggered by interrogations from said station, together with means for identifying the beacon at the interrogator station;

Figure 2 is a partial block and partial schematic diagram showing in more detail a portion of the apparatus of Figure 1;

Figure 3 is a more detailed showing of a portion of the apparatus embodied in Figure 2;

Figure 4 is a schematic diagram of a typical pulse stretcher circuit useful in this invention;

Figure 5 is a timing diagram useful for explaining the operation of the portion embodied in Figure 4;

Figure 6 is a timing diagram illustrating the time of operation of various gating circuits included in the present invention;

Figure 7 is a schematic diagram of a typical keying circuit used for initiating operation of various components of the system in a desired time sequence;

Figure 8:
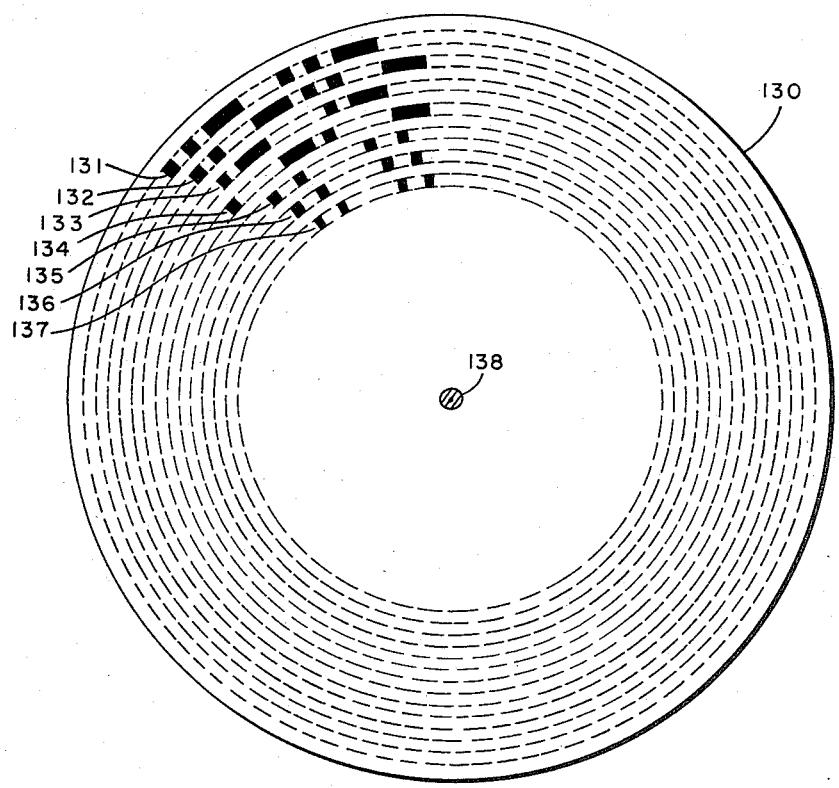
Figure 8 is a cross-sectional view of a typical embodiment of a commutator capable of keying the various circuits in a time sequence such as typically depicted in Figure 6, wherein a portion of said commutator is shown in detail.

The system proposed to fulfill the objects of the present invention represents a distinct improvement over the systems formerly in use in this field. At least one interrogation transmitter and a number of beacon transmitters are provided in the present system. Each beacon transmitter is set to respond to interrogation on a unique reply frequency, characteristic of its location. An interrogator located on board a craft whose position is desired to be determined relative to the various beacons is provided with a broad band receiver capable of receiving all possible reply frequencies transmitted by the various beacon transmitters. It is also proposed that the display produced at the interrogator by the beacon response transmissions indicates the responding beacon by a characteristic unique for each individual beacon.

The last named feature is accomplished in a specific embodiment of the invention by marking the beacon reply signals on a plan position indicator system located at the interrogator by keying the radio frequency sensitivity of the interrogator receiver to break the plan position indicator arc produced by each received beacon signal into segments forming Morse code characters, and to key the video by stretching the signal in range at selected positions on the dash of the Morse characters, whereby the combination coding provides the necessary symbols to identify the different reply frequencies.

In order to conserve components it is proposed that the receiver comprise a plurality of intermediate frequency amplifiers equal in number to a sub-multiple of the number of beacon channels and each having a different center frequency, and a group of local oscillator signals each chosen in frequency relative to the various beacon frequencies so that any one given local oscillator signal will combine with only as many beacon carrier frequencies as there are intermediate frequency amplifiers. Then by keying each local oscillator signal with a distinct Morse code, the appearance of any one of the distinct codes in the indicator will narrow the beacon identification down to that group of beacons whose frequencies are such as to beat with the identified local oscillator to produce one of the desired intermediate frequencies. For example, a single local oscillator may be switched in a Morse code manner between two frequencies so as to receive one group of beacon signals at times which form the letter "U" (dot, dot, dash) on the display, and during the remainder of the time will receive another group of beacons. This latter signal will form the "back wave" of "U," or "D" (dash, dot, dot), on the display.

Since the appearance of any assigned Morse code character on the indicator narrows the beacon identification down to one of a group of beacons which can produce an acceptable intermediate frequency, the problem of identifying the single beacon producing a given response resolves itself to one of identifying which intermediate frequency is being utilized at any given instant. To accomplish intermediate frequency identification the various intermediate frequency amplifier outputs are combined for presentation on a single plan position indicator display and are distinctly marked by the stretching of the signal outputs therefrom in range at pre-selected portions of the dash. For three I.F. amplifiers, for example, the pulses are stretched in range during the first third of the dash when received by one amplifier, during the middle third of the dash when received by the second amplifier, and during the final third of the dash when received by the third amplifier.

With three intermediate frequency amplifiers and a single local oscillator which is switched between two frequencies, a total of six beacon frequencies can be handled.

In order to obtain a simultaneous display of additional beacon transmissions sent out at different carrier frequencies, it is proposed to include additional local oscillators switched in a separate Morse code manner between two other different local oscillator frequencies. For example the second local oscillator can be keyed on one frequency to form the letter "A" (dot, dash) on the display, and in complementary fashion on the second frequency to form the back wave of "A," or "N" (dash, dot). Similarly, additional local oscillators can be included to oscillate at still different local oscillator frequencies in still other alternating time arrangements, such as to form "B" (dash, dot, dot, dot) and "V" (dot, dot, dot, dash), thereby increasing the number of different carrier frequency signals that can be simultaneously displayed.

It is contemplated that the intermediate frequency amplifiers are to be used for the additional channels by providing a timing arrangement for the local oscillators wherein the dashes of say the "A," and "U" and "V" if used, are simultaneously stretched in range and the dashes of the "N," and "D" and "B" if used, are also simultaneously stretched in range at different times from the first group.

In a typical embodiment of the system depicted generally in Figure 1, a total of twelve different beacons can be displayed and identified. As here illustrated, to each beacon an interrogator station 10 sends out exploratory pulses from a transmitter 12 via rotatable antenna 14. These exploratory pulses are transmitted in a manner similar to those transmitted by a typical pulse radar locator system such as disclosed in Patent No. 2,537,102 issued to Irving Stokes. An antenna 18 located at each of the transponder stations 20 included in the system picks up the interrogation signals that are transmitted in the direction of the beacon. Incoming signals are conveyed from antenna 18 to a receiver 24 thereby energizing a conventional trigger circuit 26, which triggers the operation of a transmitter 30. The latter transmits beacon identifying reply signals via antenna 22 on a carrier frequency that is predetermined by a frequency selector 28, which may be a manual adjustment of a capacitor or inductor or any other well-known means.

The reply signals are received at the interrogator station by antenna 16 and forwarded to broad banded receiver 32. The latter is sensitive to all the frequencies capable of being generated by the various transponder stations 20 comprising the system, but preferably insensitive to the interrogation frequency. Therefore, in lieu of utilizing radar echoes to develop a plan position indication of the location of the beacons, the signals generated at the various transponder stations in response to the interrogations transmitted in the direction of the various beacons are used.

Further included at the interrogator station 10 is a keyer 34 which periodically triggers transmitter 12 and is also coupled to a sweep generator 36 which generates the time base for a PPI type of indicator 40 employing a cathode ray tube. Sweep generator 36 is coupled to the windings contained in a cathode ray tube yoke 38 to provide a radial sweep. The cathode ray tube is shown to be of the electromagnetic deflection type although the electrostatic deflection type may also be utilized with suitable auxiliary circuitry. Yoke 38 is rotated in synchronism with the rotation of antennas 14 and 16 by means of a selsyn generator 42 which drives a selsyn motor 44 that causes rotation of the yoke 38. Generator 42 also drives a servo motor 46 which rotates antennas 14 and 16 at the same speed of rotation as that of the yoke.

The first step of beacon identification by local oscillator keying is accomplished by a special keyer 47. As previously indicated this keyer is used to initiate operation of a plurality of local oscillator circuits 48–51 with unique Morse code characteristics identifying each oscillator. In operation, the time period of a dot or a dash generation by keyer 47 is many times greater than the recurrence period of the interrogation keyer 34. This time relation permits several interrogation-reply cycles to be completed during the time duration of each dot or dash of the Morse code keying pulses generated by keyer 47. The operation of this special keyer and the local oscillator circuits will be described in more detail below. A mixer circuit 52 is coupled to the local oscillators and receiver 32 in order to mix the local oscillator frequencies with the carrier frequencies to produce a plurality of intermediate frequencies. In the present embodiment three I.F. amplifiers 53, 54 and 55, each including a substantially conventional detector circuit in the output, are provided. The final step in beacon identification is accomplished by keyer 47 which operates to provide the output of each of the I.F. amplifiers with a separate and distinguishable characteristic such as lengthening the range characteristic of a portion of the dash associated with the Morse code azimuth characteristic produced by the local oscillator. Thus, the total number of carrier frequencies that can be simultaneously displayed and distinguished is theoretically equal to the product of the number of local oscillators times the number of I.F. amplifiers.

The outputs of the I.F. amplifiers are amplified and mixed in the amplifier, mixer, driver unit 59 and applied to the control grid 56 of the cathode ray tube of indicator 40, thereby intensity modulating the radial sweep and providing an indication on the viewing screen of the oscilloscope that is analogous to that obtained in a plan position indicator type of radar presentation such as taught in aforementioned Patent No. 2,537,102. A pair of typical presentations 57 and 58 are included in Figure 1. Presentation 57 indicates the location of a beacon transmitting on a carrier frequency that beats with the local oscillator keyed to provide a "D" azimuth characteristic to result in an intermediate frequency acceptable by the second I.F. amplifier, whereas presentation 58 indicates the location of another beacon transmitting on a carrier frequency that beats with the "A" local oscillator to result in an intermediate frequency acceptable by the first I.F. amplifier.

A more detailed block diagram of some of the essential features of the circuit is shown in Figure 2. While the use of four local oscillators working into three I.F. amplifiers is shown as a typical embodiment and typical frequencies utilized in such a typical embodiment are disclosed in Table I below, it is understood that the embodiment disclosed is representative only and that the scope of the invention is not to be limited to the discussion of the typical embodiment contained herein, but only to the appended claims.

In order to eliminate any interference between harmonics of two local oscillators which occur at any intermediate frequency, the frequency of each local oscillator signal should be an integral multiple of some number which is larger than the highest intermediate frequency channel chosen. Also, in the typical embodiment described, since only three I.F. amplifiers are to be used for twelve channels, there must be common differences between the four oscillator frequencies and the I.F. amplifier frequencies. A typical frequency arrangement for a system embodying four local oscillators and three intermediate frequency amplifiers is shown in Table I.

Table I

| Local Oscillator | Intermediate Frequency (Mc.) | | Channel Frequency (Mc.) |
|---|---|---|---|
| No. 1 at 909 Mc | I.F. amplifier 53 | 43 | 952 |
| | I.F. amplifier 54 | 60 | 969 |
| | I.F. amplifier 55 | 77 | 986 |
| No. 2 at 960 Mc | | 43 | 1,003 |
| | | 60 | 1,020 |
| | | 77 | 1,037 |
| No. 3 at 1,131 Mc | | 77 | 1,054 |
| | | 60 | 1,071 |
| | | 43 | 1,088 |
| No. 4 at 1,182 Mc | | 77 | 1,105 |
| | | 60 | 1,122 |
| | | 43 | 1,139 |

From Table I it is apparent that the local oscillator signals are chosen so that each local oscillator signal will combine with only as many beacon frequencies as there are I.F. amplifiers. Thus the appearance of any one of the given Morse code characters on the indicator 40 will identify the received beacon signal as being one of three beacons.

As shown in Figure 2, pairs of signals from the Morse code keyed local oscillator circuits 48, 49, 50, 51 are mixed in conventional isolating circuits 60 and 61 and the outputs from these circuits are combined in a third iolating circuit 62 and fed to a balanced mixer circuit 63, as seen in Figure 2.

Conventional hybrid junctions are preferably used as the isolating circuits for mixing the local oscillator signals because they provide considerable isolation with a power loss of only three decibels and the pulling effect of one oscillator on another is negligible.

The balanced mixer circuit 63 is preferably another similar hybrid in which the local oscillator and R-F signal are fed in on isolated (opposite) inputs and the balanced beat frequencies are taken off the other two connections. Besides requiring less local oscillator power and causing less local oscillator radiation from the antenna, the balanced mixer effectively eliminates local oscillator noise in the intermediate frequency.

The balanced beat frequencies are then coupled to the proper I.F. amplifier via a transformer 64 and suitable L-C low pass filters including inductances 65a, 65b and 65c and capacitances 67a, 67b and 67c to prevent the radio frequency energy from entering the intermediate frequency amplifiers 53, 54 and 55.

The three channel I.F. system used in this receiver for the various beacon channel frequencies preferably has center frequencies of 43, 60 and 77 megacycles per second. In addition, the input transformer 64 and the low pass filters are built to match the three I.F. amplifiers to the balanced mixer. The filter inductances 65a, 65b and 65c are preferably tuned so that compensation can be made for variations in the filter capacitances 67a, 67b and 67c, which consist entirely of the input capacitances and associated strays of the I.F. amplifiers. Each filter is tuned for minimum attenuation at the center frequency of the corresponding I.F. amplifier.

The video reply pulse outputs of the I.F. amplifiers 53, 54 and 55 are fed to separate video channels 66a, 66b and 66c, respectively. The beacon reply pulses from these I.F. amplifiers may be distinctively stretched in accordance with factors to be explained in greater detail later in order to identify which I.F. amplifier passed the pulses and thus which of three beacon signals is received. The video outputs of the three channels are then mixed in a mixer 70 which is preferably of the cathode follower type. The mixer output is then supplied to the control grid 56 of indicator 40 via a circuit comprising a pulse transformer or inverter tube 72 and a cathode follower 74.

In Figure 3 is shown a block diagram of a typical one of the video channels 66a, 66b or 66c. Positive video reply signals from the associated I.F. amplifier are amplified in an amplifier 76 and the amplified output is fed in parallel to pulse stretcher circuits 78 and 80. Circuit 78 comprises a cathode follower 82, pulse stretcher 84, and gate 86, while circuit 80 comprises a cathode follower 88 and pulse stretcher 90. The outputs from these circuits are mixed in a mixer 92 and then amplified in an amplifier limiter 94. In the process of amplification, clipping and further amplification that takes place in the channel circuits, the width of the video reply input pulses is approximately doubled by the action of the pulse stretcher 90. Pulse stretcher 84 provides further stretching of the video pulses when gate 86 is actuated as hereinafter described. Cathode followers 82 and 88 are fed by these positive pulses and provide a low-impedance driving source for the pulse stretchers 84 and 90, respectively. The pulse-stretching circuits will be described in further detail below.

As already pointed out, there are twelve frequencies which may be received in the embodiment described, necessitating an equal number of distinct characters which can be displayed on a PPI indicator and which are each related to a single frequency. Only two parameters are available to give identity to a displayed signal—azimuth and range. Azimuth-Morse coding is preferably used to break the arc of the signal into small dot-dash elements suitable for representation as Morse code characters, and range-coding is preferably used to increase the thickness of certain portions of the reply signal arc. By gating the local oscillators on and off in a regular sequence, azimuth-coding may be obtained; and by the operation of gates on pulse-stretching circuits in the video channels, the range-coding may be obtained.

The importance of keeping the duty cycle of the omni-channel receiver as high as possible led to the choice of Morse code characters so related that the off period of one local oscillator would be coincident with the on periods of another, thus producing a time-sharing arrangement between a pair. For one pair of local oscillator circuits, 48 and 49 for example, the Morse characters U and D were chosen, and for the other 50 and 51, A and N, resulting in the time relationship between the local oscillator circuits illustrated in Figure 6.

As illustrated in Figure 6 oscillator circuits 1 and 2 (48 and 49) of Figure 2 are keyed off and on (by keyer 47) in a complementary manner according to the "U" and "D" Morse code characters. In this embodiment, the duration of each dot element of the code corresponds in time to several interrogation cycles to thus permit an accurate coding of the reply signals as they appear on the indicator. In a like manner keyer 47, as later described in detail, performs an "A"–"N" coding of oscillators 3 and 4 (50 and 51) of Figure 2 so that the reply signals received in response to these oscillator signals will appear with a corresponding coding of the reply signal arc appearing on the indicator.

As previously indicated, Morse coding of the oscillator circuits will narrow the problem of beacon identification down to one of three beacons as indicated in Table I, and to determine which of the three beacons is causing the response it is only necessary to indicate from which of the three intermediate frequency amplifiers the response emanates. This is accomplished most easily by modulating the output of each intermediate amplifier differently. For display purposes, I find that this additional modulation is most readily accomplished by selectively stretching those reply signals received during different portions of the dash elements comprising the Morse code used. Again as previously indicated, according to this invention I prefer to stretch the reply signals received during the first portions of the dashes which pass through intermediate frequency amplifier 53, for example, and during the middle and final portions of the dashes passing through I.F. amplifiers 54 and 55, respectively.

To accomplish this selective pulse stretching, keyer 47, as later described, operates to provide suitable gate signals as indicated in Figure 6 to actuate the pulse stretcher circuits 78 (Figure 3) associated with the different intermediate frequency amplifiers by opening gate 86. Since it is apparent from Figure 6 that the dashes of the various Morse codes fail to coincide in time, two time space pulse stretcher circuits must be provided for each channel as indicated. These stretcher circuits are timed so that one gate occurs during corresponding portions of the dashes of the "U" and "A" codes and the other occurs during the corresponding portions of the "D" and "N" codes.

Figure 4 shows a typical embodiment of a pulse stretcher such as 84 contained in Figure 3. A cathode resistor 100 is contained in the cathode circuit of cathode follower tube 82a. The pulsed voltages appearing across the cathode resistor are applied through capacitor 102 and a crystal rectifier 104 to the control grid of tube 106. The capacitor 102 is included to prevent direct current components from entering either rectifier 104 or tube 106. A storage capacitor 108 is coupled between the output of the rectifier and ground. A variable resistance 110 is connected between the negative terminal of a positive grounded grid voltage source 112 and a grid resistor 114. The output of tube 106 has a shape dependent upon the setting of variable resistance 110. The latter in turn determines the time necessary for grid circuit of tube 106 to resume its normal grid bias in the interval between pulses.

The output of tube 106 is coupled via a resistance-capacitance coupling 116, 118 to the grid of an amplifier limiter tube 120, which cuts off the peaks of the output pulses from tube 106.

Attention is invited to Figure 5 for a clearer explanation of the operation of the pulse stretcher circuit shown in Figure 4. Pulses 130, 131 and 132 corresponding to received video reply pulses appear at point (A) upon application of positive input pulses to the grid of tube 82a, as shown in Figure 5(A). This provides positive pulse voltages to be applied to the grid of tube 106. The appearance of a positive pulse at the grid of tube 106 makes the latter conductive, thereby lowering its plate potential, or the potential present at point (B). The capacitor 108 stores the potential applied to the grid of tube 106 and discharges through resistor 114 and variable resistance 110 until the potential across the capacitor 108 is equal to the normal grid bias of tube 106. As stated above, the time required for tube 106 to resume its normal bias is dependent upon the setting of variable resistance 110. The greater the resistance setting of the variable resistance, the longer tube 106 remains conductive. The plate voltage of tube 106 gradually returns to its normal value as the grid signal is decreased due to the discharge of condenser 108 through the grid resistor and variable resistance. Figure 5(B1) shows what happens to the signal at point (B) when variable resistance 110 is set for a low resistance value, thereby insuring a relatively rapid discharge of capacitor 108, whereas Figure 5(B2) shows the relation of the signal at point (B) to time when 110 is set for a high resistance value, thereby causing a relatively slow discharge of capacitor 108.

Tube 120 is normally biased so that it is conducting saturation current. When tube 106 is conducting, though, the negative pulses from point (B) drive the grid of tube 120 below cut-off. The voltage at point (C) then rises to the supply voltage during the period of the pulse. The output is therefore a series of positive pulses having a width equal to the time required for tube 106 to be cut off. At point (C) of Figure 4, output pulses having shapes corresponding to those shown in Figure 5(C1) result when the outputs depicted in Figure 5(B1) are produced at point (B). Similarly, pulse outputs having shapes depicted in Figure 5(C2) are produced at point (C) when the outputs at point (B) are those depicted in Figure 5(B2).

As can be seen from a study of Figure 6, 10 units of time are required for the alternate presentation of the Morse characters "U" and "D" by local oscillator circuits No. 1 (48) and No. 2 (49). Oscillator circuits No. 3 (50) and No. 4 (51) are gated to provide Morse code characters "A" and "N" in synchronism with the oscillations of oscillator circuits No. 1 (48) and No. 2 (49), respectively, except that oscillator circuit No. 3 (50) is not operated during the times oscillator circuit No. 1 (48) is oscillating to produce the first dot of the "U" code and oscillator circuit No. 4 (51) is not operated during the times oscillator circuit No. 2 (49) is oscillating to produce the second dot of the "D" code. Gate 86 of channel No. 1 (66a) is provided with a gate (Figure 6) at a time corresponding to the first third of the dashes produced by the various local oscillator circuits. This gate causes the reply of pulses stretched by pulse stretcher 84 to be available during the first third of the dashes. Similar gates are provided to channels 2 and 3 (66b and 66c) to cause selective stretching of the middle and final thirds of the dashes.

Pulse stretcher circuit 80 (Figure 3), as mentioned above, comprises cathode follower 88 and pulse stretcher 90. The latter provides sufficient range stretching for the entire Morse code pattern to thereby enable the various code patterns to be adequately presented on the viewing screen of indicator 40. Pulse stretcher circuit 80 provides continuous stretching of the entire Morse code pattern that may be adjustable for range, as desired, whereas pulse stretcher circuit 78 including pulse stretcher 84 provides adidtional selective pulse stretching for only a preselected portion of the dash associated with the Morse code.

Pulse stretcher 90 is generally similar in circuitry to the specific embodiment shown in Figure 4 for pulse stretcher 84. However, the setting of variable resistance 110 is different for the lesser amount of pulse stretching required for proper presentation than for the selectivity required of pulse stretcher 84.

The signals that pass through the mixer 92 and amplifier limiter circuits 94 are mixed with the output of the other two video channels. The resulting mixed signal, after passing through a cathode follower, becomes the video output of the omni-channel receiver and is displayed on indicator 40.

Since the time duration of the Morse code elements are relatively long in comparison to the interrogator cycle, a mechanical type commutator can be used for keyer 47 to generate the various signals depicted in Figure 6.

A typical block diagram of a keyer capable of controlling the operation of the various local oscillator circuits and video pulse channels is shown in Figure 7. As illustrated a light source 122 is provided for seven different light paths. These paths are preferably lucite tubes 123, 124, 125, 126, 127, 128, 129 which convey light rays from source 122 to seven different coded paths on a commutator disc 130 which is essentially a specially-apertured rotating disc. Commutator 130 is provided with seven sets of circumferentially arranged and coded apertures 131 through 137, a portion of which are indicated as shown in greater detail in Figure 8. Commutator 130 is mechanically coupled via rotatable shaft 138 to a motor 139. The latter is preferably connected to the main servo loop rotating the antennas and rotated at a speed which causes a complete code cycle of any given Morse code characters every 10 degrees, for example, of antenna rotation. On the opposite side of commutator 130 from and aligned with said lucite tubes are seven photocells 141 through 147. The photocells, Lucite tubes and apertures are so arranged that tube 123 is aligned with aperture set 131 and photocell 141, tube 124 with aperture set 132 and photocell 142, etc., so that an output current is initiated in a photocell whenever an aperture associated with one of the circumferentially arranged sets comes into alignment with the photocell and Lucite tube. The output currents are amplified in amplifiers 151 through 157 and the amplified outputs are used to initiate operation of the one of the seven coding circuits it is used to key.

It is noted that each dot and dash contained in the various Morse code characteristics is not a single spot, but comprises a plurality of spots so closely arranged on the presentation device that they appear as dots and dashes. The number of spots required to form a single dot is a function of the rotational rate of the interrogation antenna and the rate of repetition of the radial sweep. For an interrogator having a radial sweep repetition rate of 500 pulses per second and having an antenna rotating at 6 revolutions per minute, there are 5000 radial sweeps per revolution or approximately 14 spots forming the Morse code dots and approximately 42 spots forming the Morse code dashes.

Obviously many modifications and variations of the present invention are possible in the light of the above teachings. It is therefore to be understood that the invention may be practiced otherwise than as specifically described within the scope of the appended claims.

The invention described herein may be manufactured and used by or for the Government of the United States of America for governmental purposes without the payment of any royalties thereon or therefor.

What is claimed is:

1. In a radio frequency signal display system, a broad band receiver having a plurality of distinct frequency local oscillator circuits and a plurality of distinct intermediate frequency amplifier circuits, means for mixing signals having carrier frequencies within said broad band with signals generated by the local oscillator circuits to provide an intermediate frequency acceptable by one of said amplifier circuits, each of said local oscillator circuits comprising means for modulating the carrier frequency signals in a first predetermined manner indicative of the local oscillator circuit with which the mixing operation occurs, and each of said intermediate frequency amplifier circuits being provided with means for modulating the mixed signals in a second predetermined manner indicative of the amplifier circuit which is instantaneously passing the signal.

2. In a radio frequency signal display system, a broad band receiver having a plurality of distinct frequency local oscillator circuits and a plurality of distinct intermediate frequency amplifier circuits, means for mixing signals having carrier frequencies within said broad band with signals generated by the local oscillator circuits to provide an intermediate frequency acceptable by one of said amplifier circuits, each of said local oscillator circuits comprising means for modulating the carrier frequency signals in a first predetermined manner indicative of the local oscillator circuit with which the mixing operation occurs, each of said intermediate frequency amplifier circuits which is instantaneously passing the signal being provided with means for modulating the mixed signals in a second predetermined manner indicative of the amplifier circuit through which the signal passes, and means for displaying the modulated output from said amplifier circuits.

3. A radio frequency identification system comprising an interrogator transmitter, at least one remotely disposed transponder capable of being triggered by interrogations generated by said transmitter to transmit reply signals on a predetermined one of a plurality of carrier frequencies contained within a given frequency band, a broad band receiver located at said interrogator transmitter having a plurality of frequency distinct local oscillator circuits and a plurality of distinct intermediate frequency amplifier circuits, means for mixing signals having carrier frequencies within said broad band with signals generated by the local oscillator circuits to provide an intermediate frequency acceptable by one of said amplifier circuits, each of said local oscillator circuits comprising means for modulating the carrier frequency signals in a first predetermined manner indicative of the local oscillator circuit with which the signal is mixed, each of said intermediate frequency amplifier circuits being provided with means for modulating the mixed signals in a second distinct predetermined manner indicative of the amplifier circuit through which the signal passes, and means for displaying the modulated output from said amplifier circuits as a function of the range and azimuth of the individual transponders transmitting the replies.

4. In a radio frequency signal display system, a superheterodyne receiver capable of energy reception over a broad band of the frequency spectrum, said receiver comprising at least one pair of local oscillator circuits having different oscillating frequencies, means for intermittently keying the local oscillator circuits in each pair alternately in time units that form reciprocal Morse code patterns, a plurality of intermediate frequency amplifiers of different center frequencies, means for mixing signals having carrier frequencies within said broad band with signals generated by the local oscillator circuits to provide an intermediate frequency acceptable by one of said amplifiers, means coupled to said intermediate frequency amplifiers for applying a second coded characteristic dependent upon the center frequencies of the signals accepted by said amplifiers, and means for displaying the modulated output from said amplifiers as a function of the range and azimuth of the points of origin of the received energy.

5. A radio frequency identification system comprising an interrogator transmitter, at least one remotely disposed transponder capable of being triggered by interrogation signals transmitted by said transmitter to transmit reply signals on a predetermined one of a plurality of carrier frequencies contained within a given broad frequency band, a broad band receiver located at said interrogator transmitter having a plurality of frequency distinct local oscillator circuit pairs and a plurality of intermediate frequency amplifiers of different center frequencies, means for mixing signals having carrier frequencies within said broad band with signals generated by the local oscillator circuits to provide an intermediate frequency acceptable by one of said amplifiers, means for intermittently keying the local oscillator circuits in each pair alternately in time units that form reciprocal Morse code patterns, means coupled to said intermediate frequency amplifiers for applying a second coded characteristic dependent upon the center frequencies of said amplifiers to the signals accepted by said amplifiers, and means for displaying the modulated output from said amplifiers as a function of the range and azimuth of the individual transponders transmitting the replies.

6. A radio frequency display system comprising an interrogator transmitter having a rotatable directional energy release pattern, at least one remotely disposed transponder capable of being triggered by interrogation signals transmitted by said transmitter to transmit reply signals on a predetermined one of a plurality of carrier frequencies contained within a given broad frequency band, a cathode ray oscilloscope having a radial sweep circuit synchronized with the transmissions of said interrogator transmitter and an azimuthal sweep synchronized with the azimuthal direction of said transmissions, a broad band receiver tuned to said given frequency band and located at said interrogator transmitter, said receiver having a plurality of frequency distinct local oscillator circuits and a plurality of distinct intermediate frequency amplifiers, means for mixing signals having carrier frequencies within said broad band with signals generated by the local oscillator circuits to provide an intermediate frequency acceptable by one of said amplifiers, means for intermittently keying the local oscillator circuits in pairs alternately in time units to form reciprocal Morse code patterns, means coupled to said intermediate frequency amplifiers for applying a second code characteristic to the signal passed by each of said amplifiers, and means for applying the modulated output from said amplifiers to said cathode ray oscilloscope to intensity modulate the sweep circuit outputs of said oscilloscope in azimuth and range according to the characteristics supplied to the local oscillator circuits and intermediate frequency amplifiers.

7. A radio frequency display system comprising an interrogator transmitter operable to provide a rotatable directional pulse energy release pattern, at least one remotely disposed transponder capable of being triggered by interrogation signals transmitted by said transmitter to transmit reply signals on a predetermined one of a plurality of carrier frequencies contained within a given broad frequency band, a cathode ray oscilloscope having a radial sweep synchronized with the transmissions of said rotatable energy release pattern and an azimuthal sweep synchronized with the azimuthal direction of said transmissions, a broad band receiver tuned to said given frequency band and located at said interrogator transmitter, said receiver having at least one pair of distinct frequency local oscillator circuits and a plurality of distinct intermediate frequency amplifiers, means for mixing signals having carrier frequencies within said broad band with signals generated by the local oscillator circuits to provide an intermediate frequency acceptable by one of said amplifiers, means for intermittently keying the local oscillator circuits in each pair alternately in time units to form reciprocal Morse code patterns comprising a dash and at least one dot, pulse lengthening means coupled to said intermediate frequency amplifiers for applying a range lengthening characteristic dependent upon the center frequencies of the signals accepted by said amplifiers and applied to a predetermined portion of the dash of one of said Morse code patterns, and means for applying the modulated output from said amplifiers to said cathode ray oscilloscope to intensity modulate the beam of said oscilloscope in azimuth and range according to the modulation characteristics supplied by the local oscillator circuits and intermediate frequency amplifiers respectively.

8. A radio frequency display system comprising a transmitter providing a rotatable directional pulse energy release pattern, at least one remotely disposed transponder capable of being triggered by interrogation signals transmitted by said transmitter to transmit reply signals on a predetermined one of a plurality of carrier frequencies contained within a given broad frequency band, a cathode ray oscilloscope having a radial beam sweep synchronized with the transmissions of said rotatable pulse energy release pattern and an azimuthal sweep synchronized with the azimuthal direction of said transmissions, a broad band receiver tuned to said frequency band and located at said transmitter site, said receiver having a plurality of frequency distinct local oscillator circuits and a plurality of distinct intermediate frequency amplifiers, means for mixing signals having carrier frequencies within said broad band with signals generated by the local oscillator circuits to provide an intermediate frequency acceptable by one of said amplifiers, each of said local oscillator circuits comprising means for modulating the carrier frequency signals in a first predetermined manner indicative of the oscillator circuits with which the signal is being mixed, and each of said intermediate frequency amplifiers being provided with means for modulating the mixed signals in a second predetermined manner indicative of the amplifier passing the signal, and means for applying the modulated output from said amplifiers to said cathode ray oscilloscope to intensity modulate the sweep circuit outputs of said oscilloscope in azimuth and range according to the characteristics supplied by the local oscillator circuits and intermediate frequency amplifiers.

9. In a radio frequency signal display system, a receiver operable to receive a plurality of predetermined carrier frequency signals obtained within a given broad frequency band comprising local oscillator means for providing a plurality of distinctively time coded local oscillator signals, means for mixing signals having carrier frequencies within said broad band with signals generated by the local oscillator means, a plurality of intermediate frequency amplifier circuits each tuned to pass a distinct intermediate frequency signal, each of said local oscillator signals being operable to produce from said given band of received carrier frequencies as many intermediate frequency beat signals as there are intermediate frequency amplifier circuits, coding means for impressing upon the output from each of said amplifier circuits a distinctive code signal identifying the circuit, and means for monitoring the output signals derived from said amplifier circuits.

10. In a radio frequency signal display system, a receiver operable to receive a plurality of predetermined carrier frequency signals contained within a given broad frequency band comprising local oscillator means for providing a plurality of distinctively time coded local oscillator signals, means for mixing signals having carrier frequencies within said broad band with signals generated by the local oscillator means, a plurality of intermediate frequency amplifier circuits each tuned to pass a distinct intermediate frequency signal, each of said local oscillator signals being operable to produce from said given band of received carrier frequencies as many intermediate frequency beat signals as there are intermediate frequency amplifier circuits, and coding means for impressing upon the output from each of said amplifier circuits a distinctive code signal identifying the circuit.

11. In a radio frequency signal display system, a receiver operable to receive a plurality of predetermined carrier frequency signals contained within a given broad frequency band comprising local oscillator means for providing a plurality of distinct local oscillator signals, means for mixing signals having carrier frequencies within said broad band with signals generated by the local oscillator means, a plurality of intermediate frequency amplifier circuits each tuned to pass a distinct intermediate frequency signal, each of said local oscillator signals being operable to produce from said given band of received carrier frequencies as many intermediate frequency beat signals as there are intermediate frequency amplifier circuits, coding means for impressing upon the output from each of said amplifier circuits a distinctive code signal identifying the circuit, and means for monitoring the output signals derived from said amplifier circuits.

12. In a radio frequency signal display system, a receiver operable to receive a plurality of predetermined carrier frequency signals contained within a given broad frequency band comprising local oscillator means for providing a plurality of distinctively time coded local oscillator signals, means for mixing signals having carrier frequencies within said broad band with signals generated by the local oscillator means, a plurality of intermediate frequency amplifier circuits each tuned to pass a distinct intermediate frequency signal, each of said local oscillator signals being operable to produce from said given band of received carrier frequencies as many intermediate frequency beat signals as there are intermediate frequency amplifier circuits, and means for monitoring the output signals derived from said amplifier circuits.

13. A radio frequency identification system comprising an interrogator transmitter, at least one remotely disposed transponder capable of being triggered by interrogations generated by said transmitter to transmit reply signals on a predetermined one of a plurality of carrier frequencies contained within a given frequency band, a broad banded receiver means located at said transmitter site for receiving reply signals, cathode ray indicator means for providing a two dimensional indication of the relative position of said remote transponder, and means responsive to the output of said receiver means to distinctively modulate the indications on said cathode ray indicator means in both dimensions in accordance with the frequency of the reply signals.

14. A radio frequency identification system comprising an interrogator transmitter, at least one remotely disposed transponder capable of being triggered by interrogations generated by said transmitter to transmit reply signals on a predetermined one of a plurality of carrier frequencies contained within a given frequency band, a broad banded receiver means located at said transmitter site for receiving reply signals, a cathode ray plan position indicator means for providing a range and azimuth indication of the relative position of said remote transponder, and means responsive to the output of said receiver means to distinctively modulate the cathode ray indications in a predetermined manner in both range and azimuth in accordance with the frequency of the reply signals.

15. A system as defined in claim 14 wherein the azimuthal modulations comprise Morse code characteristics.

16. A radio frequency identification system comprising an interrogator transmitter, at least one remotely disposed transponder capable of being triggered by interrogations generated by said transmitter to transmit reply signals on a predetermined one of a plurality of carrier frequencies contained within a given frequency band, a broad banded receiving means located at said transmitter site for receiving reply signals, a plurality of frequency distinct oscillator circuits, a plurality of distinct intermediate frequency amplifier circuits, means for mixing signals having carrier frequencies within said broad band with signals generated by the local oscillator circuits to provide an intermediate frequency acceptable by one of said amplifier circuits, each of said local oscillator circuits being capable of combining with a number of transponders equal in number to the intermediate frequency circuits, means for distinctively keying each of said local oscillator circuits in time units that form Morse code patterns, means for modulating the mixed signals in a distinctive predetermined manner indicative of the circuit through which the signals pass, and means for applying the modulated output of the intermediate frequency circuits to a cathode ray oscilloscope to intensity modulate the display thereof in azimuth and range according to the characteristics supplied to the local oscillator circuits and intermediate frequency amplifier circuits respectively.

References Cited in the file of this patent

UNITED STATES PATENTS

| | | |
|---|---|---|
| 2,460,900 | Newbold | Feb. 8, 1949 |
| 2,525,679 | Hurvitz | Oct. 10, 1950 |
| 2,568,265 | Alvarez | Sept. 18, 1951 |